Figure 1:
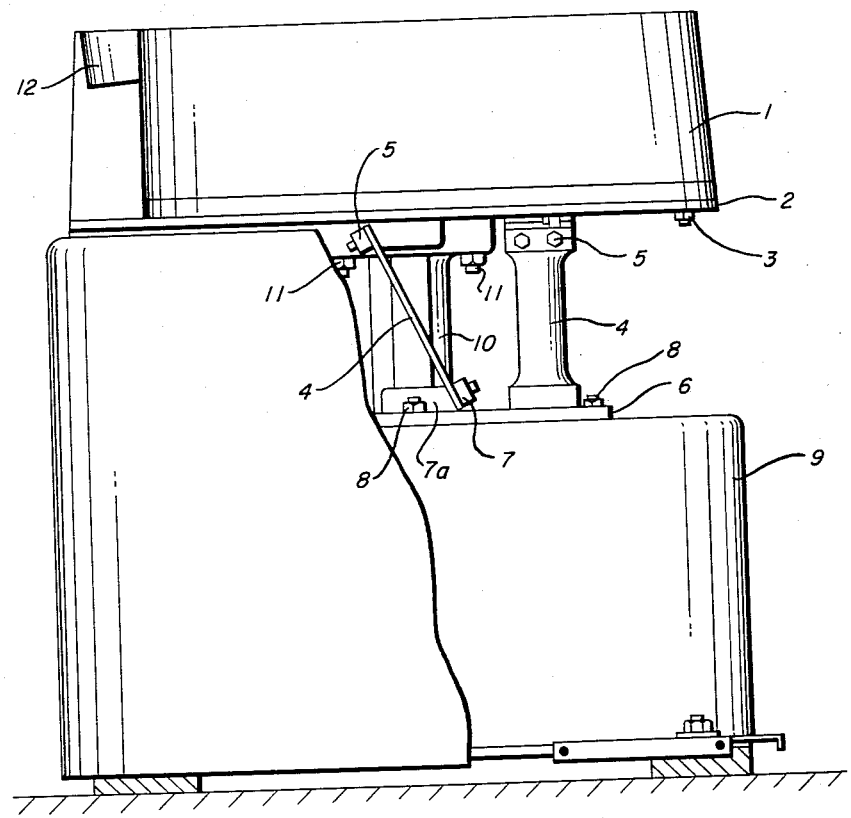

March 6, 1962 W. C. BURGESS, JR 3,023,738
POWER CONTROL SYSTEM FOR PNEUMATIC, FREE-PISTON
VIBRATION INDUCING DEVICES
Filed March 26, 1959 3 Sheets-Sheet 1

INVENTOR.
WARREN C. BURGESS, JR.
BY
ATTORNEY

March 6, 1962 W. C. BURGESS, JR 3,023,738
POWER CONTROL SYSTEM FOR PNEUMATIC, FREE-PISTON
VIBRATION INDUCING DEVICES
Filed March 26, 1959 3 Sheets-Sheet 2

INVENTOR.
WARREN C. BURGESS, JR.
BY
Robert A. Sturges
ATTORNEY

INVENTOR.
WARREN C. BURGESS, JR.
BY
Robert A. Sturges
ATTORNEY

United States Patent Office
3,023,738
Patented Mar. 6, 1962

3,023,738
POWER CONTROL SYSTEM FOR PNEUMATIC, FREE-PISTON VIBRATION INDUCING DEVICES
Warren C. Burgess, Jr., 4972 Grace Road, North Olmsted, Ohio
Filed Mar. 26, 1959, Ser. No. 802,213
4 Claims. (Cl. 121—17)

This invention relates, as indicated, to vibration inducing devices, and more particularly to apparatus including such a vibration inducing device characterized by the presence therein of means for controlling the power output thereof at given frequencies. In more specific aspects, this invention relates to a method for controlling the amplitude of vibration substantially independently of frequency of pneumatically vibrated vibratory conveyors.

A principal advantage of pneumatic, free-piston vibration inducing devices is that the frequency of vibration can be varied over a wide range. This is done by varying the pressure of the gas let into the vibrator such as, for example, by means of a pressure regulating valve in the line intermediate a pressurized gas source and the pneumatic, vibration inducing device. This enables the adjustment or tuning of the frequency of vibration to the natural frequency of the vibratory conveyor at which point, as it is well known, most efficient operation occurs. Variations in the construction and the loading of the conveyor apparatus cause changes in the natural frequency of the device which may be met by regulation of the inlet pressure. This has been a major advance in the vibratory conveyor art in that it is now no longer necessary to design the springs and vibratory conveyor system to have a natural frequency corresponding with an electromagnetic vibration inducing device or a mechanical vibration inducing device, e.g., an unbalanced wheel, which are operable only at a fixed frequency determined by the electrical impulse source.

In the further explanation of this invention, reference will be made to improved devices described and claimed in my Patent 2,861,548 dated November 25, 1958. It will be understood that in using these devices for illustrative purposes that other pneumatically driven devices may also be used herein to secure the advantages of this invention, and that there is no intention to limit the invention to the vibration inducing devices of Patent No. 2,861,548. Vibration inducing devices constructed, for example, in accordance with the teachings of that patent, have a power output in relation to the power input, or efficiency, which is exceptionally high. These devices are particularly useful as the driving means for vibratory conveyors and screens of all types whereby parts, particles, or articles are moved upwardly, or downwardly, or laterally along a spring mounted pathway. So far as this invention is concerned, it makes no difference what the contour of the pathway may be along which the parts, particles or articles must travel. Hence, the pathway may be straight or curved, helical or spiral, horizontal or inclined, or any combination of these variations. Vibratory conveying apparatus with which the advantages of the present invention may be secured include, therefore, vibratory conveyors having an elongated trough, helical conveyors mounted within a cylindrical tube for elevating parts or particles from one level to another, or reversing the same, and bowl-type parts feeders characterized by an upstanding circular wall having disposed about the inner wall thereof a spiral track receding from a more central part of the bottom of the bowl upwardly, around and outwardly to the upper lip of the bowl.

It has been found that in the operation of vibratory conveyors driven by pneumatic, free-piston vibration inducing devices, that the power output of these devices is, in many cases, in excess of that which is necessary or desired under given circumstances. The amplitude of vibration may be too great, and for other reasons it may be desirable to limit the amplitude of vibration for easier control in orienting and handling of parts, particles or articles being conveyed by the apparatus. It is, therefore, a principal object of the present invention to provide apparatus for controlling the power and concurrently therewith the amplitude of vibration of devices driven by pneumatic, free-piston vibration inducing devices.

Still another object of this invention is to provide, in more specific embodiments, apparatus which can be operated at or near natural frequency and provide substantially independent control over the amplitude of vibration.

Other objects of the invention will appear as the description proceeds.

To the accomplishment of the foregoing and related ends, said invention, then, consists of the means hereinafter fully described and particularly pointed out in the appended claims, the following description and annexed drawings setting forth in detail certain illustrative embodiments of the invention, such disclosed means constituting, however, but a few of the various forms in which the principle of this invention may be employed.

Broadly stated, therefore, this invention contemplates a pneumatic, free-piston vibration inducing device adapted to be driven by gas under pressure having means for regulating the inlet pressure of said gas and independent means for regulating the pressure drop across said device. More specifically, this invention contemplates a pneumatic, free-piston vibration inducing device having an inlet line for conducting gas under pressure to said device to effect a reciprocatory movement of said piston, and an outlet line for exhausting spent gas from said device, having means in the inlet line for regulating the pressure of the gas, and independent means in the outlet line for regulating the pressure drop across the device.

In the past, control of the amplitude of vibration or power output of the device has been achieved by varying the difference between the drive frequency and natural frequency. The greater the difference, the less the amplitude. Since frequency of vibration is directly proportional to the inlet pressure, such changes in power output or amplitude have been done at the cost of operating at natural frequency, the most efficient point of operation. The surprising discovery underlying the present invention is that substantially independent control of amplitude and power can be secured by controlling the pressure drop across the apparatus by means of throttling the exhaust gases.

Figure 2:
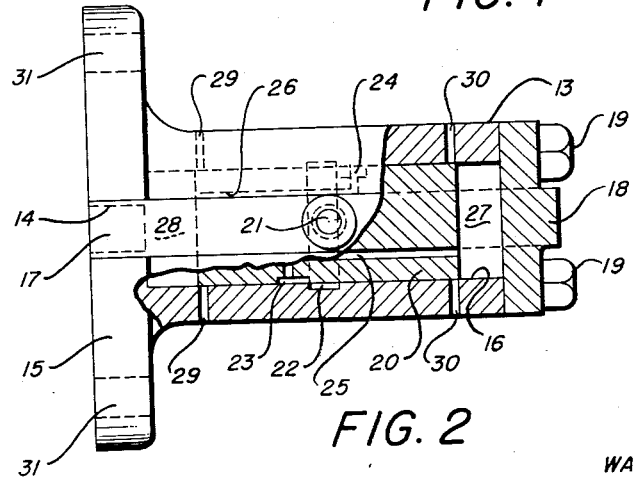
Figure 3:
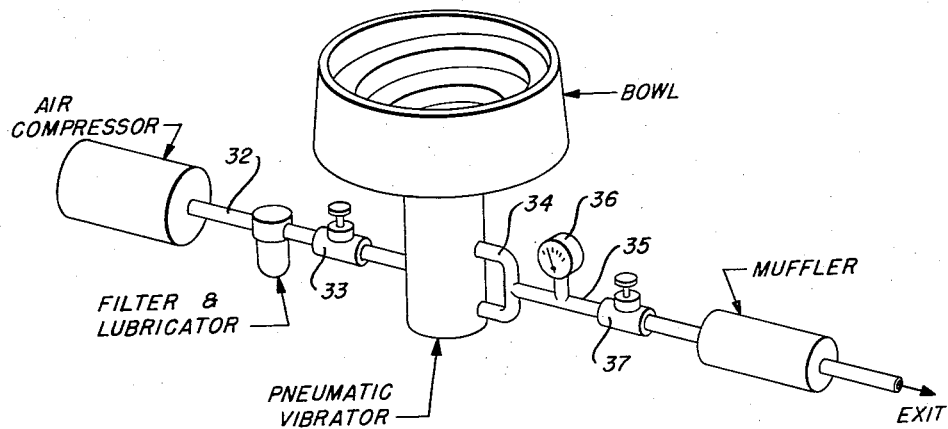
Figure 4:
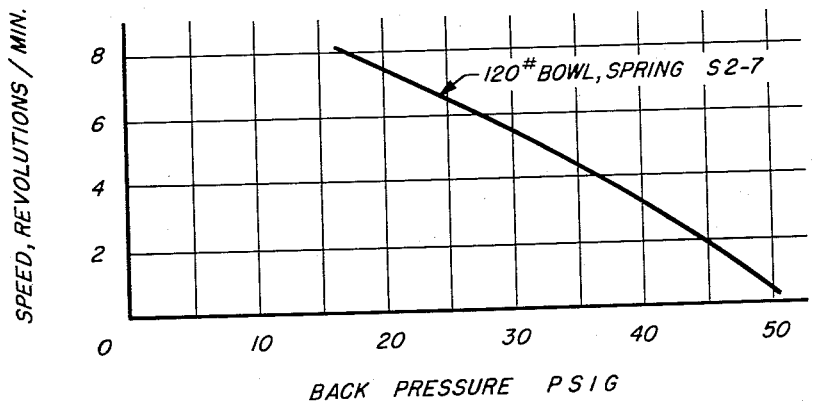

In the annexed drawings:
FIG. 1 is a partially cut-away view of a spring mounted bowl-type vibratory parts feeder.
FIG. 2 is a partial cross-sectional view of a pneumatic, free-piston vibration inducing device in connection with which this invention is particularly useful.
FIG. 3 is a diagrammatic illustration of apparatus in accordance with the present invention.
FIG. 4 is a graph showing the degree of control in the movement of parts about a spiral track bowl feeder in relation to the back pressure on the exhaust line.

Referring now more particularly to FIG. 1, there is shown a vibratory conveyor apparatus having as the receptacle, a feeder bowl 1. The feeder bowl 1 may be cast or fabricated from any convenient material, one such material being a polyester reinforced with glass fibers, another being steel. The feeder bowl 1 is conveniently affixed to a plate 2, such as by bolt 3. The plate 2 is supported upon a plurality of modified flat springs 4, two of which are shown in FIG. 1, each of those shown having an opposite counterpart ont shown, making a total of four modified flat springs. This number is merely exemplary, and may be more or less. The springs 4 are conveniently clamped to the plate 2 as by bolt means 5, and the other end thereof to a base plate 6 as by bolt means through clamp 7—7a. The plate 6 is, in turn, conveniently bolted as by bolts 8, to a massive base 9.

Also shown in FIG. 1 is a pneumatic, free-piston vibration inducing device 10 mounted axially of the bowl 1 and conveniently bolted to the bowl 1 through the base plate 2 as by bolts 11.

As indicated above, there are four modified single member flat springs 4 spaced 90° apart and equidistant from the axis of the bowl 1. The springs 4 are angularly disposed at about 60° inclination to the base 6, although any angular disposition between about 15° and about 80° may be used. The purpose of the angular and circular disposition is to provide that the effect of the spring members is not only to return the bowl upwardly after being lowered, but also to exert a torque in a direction to throw the material counterclockwise (in the example shown in FIG. 1) along the ramp to the exit 12 of the bowl 1. Reversal of the direction of inclination of the springs will reverse the direction of flow. The confined path of vibration or reciprocation in this embodiment is curved and inclined, and may have a length varying from about .01″ to .5″ in larger devices depending on the desired feed rate. In elongated trough or tube conveyors, or screens, the angular disposition to the base may be of the same magnitude, 15°–80°, as above, but the springs are otherwise aligned in 1, 2, or more rows.

A vibration inducing device of the pneumatic, free-piston type is shown in FIG. 2.

Referring more particularly to FIG. 2, there is provided a vibrator casing 13 having a central circular bore 16 therethrough. The casing 13 is provided with a hole 14 which is drilled through the vibrator's sub-base 15 in order to properly machine the inner chamber 16 of the casing 13. The hole 14, upon completion of the machining operation, is filled by inserting therein a core plug 17 which provides an air-tight seal. The opposite end of the casing 13 is likewise made air-tight by any suitable means, such as, a head 18 firmly held in position on the casing 13 by bolts 19.

Mounted within the circular bore 16 is a cylindrical free-piston 20, the outer surface of which is in sliding contact with the machined inside surface of the cylindrical bore 16. The free-piston 20 is mounted so as to provide for reciprocal movement in an axial direction within the casing 13.

The casing 13 is further provided with an inlet port indicated at 21 to permit the introduction of gas under pressure into the system. This inlet port 21 may be provided with a conventional inlet one-way shut-off valve, or any other conventional inlet valve to regulate the flow of gas to the system. This has been shown in diagrammatic form in FIG. 3. Such inlet port 21 leads to a circularly grooved chamber 22 disposed between the piston 20 and the casing 13, and by means of which the gas under pressure is directed alternately into recesses or ports 23 and 24 in the piston 20, which, in turn, carries the gas under pressure through ducts 25 and 26 respectively, to the end chambers 27 and 28 respectively, of the casing 13. Thus, as the piston 20 is driven in a reciprocating manner, the gas under pressure will alternately be directed to end chambers 27 and 28 of the casing 13. Following the introduction of the gas under pressure into end chamber 27, the gas is subsequently reelased through exhaust ports 30. Similarly, following the introduction of the gas under pressure into chamber 28, the gas is subsequently released through exhaust ports 29.

For an amplified disclosure of the design of this form and other preferred pneumatically operated free-piston vibration inducing devices for use in accordance with this invention, reference may be had to my Patent 2,861,548 dated Nov. 25, 1958.

The manner of operation of the pneumatic free-piston vibration-inducing device useful in this invention may be briefly described as follows: Gas under pressure, for example, compressed air under 10 to 100 p.s.i.g. is introduced to the system through the inlet port 21 which leads to the circular chamber 22. When the free-piston 20 is slightly to the left of that illustrated in FIG. 2, circular chamber 22 is in contact with the opening of port 24. Thus, the gas under pressure flows through port 24 into end chamber 28, where such gas under pressure tends to force the free-piston 20 to the right. As the free-piston moves to the right, contact is established between circular chamber 22 and port 23, and contact between circular chamber 22 and port 24 is eliminated. Thus, gas under pressure commences flowing through port 23 and duct 25 into end chamber 27, tending to decelerate the movement of free-piston 20 to the right. However, the momentum of the free-piston 20 carries it beyond the point where full contact between circular chamber 22 and port 23 is established. Thus, the gas present in the end chamber 27 is substantially sealed in that end chamber, causing the pressure therein to build up greatly as the free-piston 20 continues to move to the right. Such increased pressure decelerates the movement of the piston to the right at an increased rate, stops it, and then accelerates the movement of the free-piston to the left to complete the cycle. When the positioning of the ducts and exhaust ports is as taught in the aforementioned patent, there may be provided the proper degree of "end clearance" between the end of the free-piston 20 and the inner face of the head 18, for example, such that at cut-off, enough gas is present that a temporary cushion of gas under a pressure in excess of line pressure may be formed, so that the operation of the vibration inducing device is substantially noiseless except for the escape of gas from the exhaust ports.

Also as mentioned in the aforementioned patent, the frequency of vibration or reciprocation of the free-piston 20 can be varied over a considerable range by adjustment of the pressure of the gas fed to the inlet port 21. This feature frees the design of the flat spring members 4 from dependence upon the frequency of the electrical source of energy in electric motor driven or electro-magnetically vibrated devices. Moreover, the power delivered by these pneumatic, free-piston vibration inducing devices is sufficient to convey materials at the advanced rates frequently demanded by industry, that is, in some cases, as much as 900 inches per minute.

These free-piston, pneumatic vibration inducing devices provide a continuous deceleration and acceleration of the moving piston as distinct from that in an impacting type of action. The power input in one direction is the same as the power input in the opposite direction. Moreover, the frequency can be varied in response to the inlet gas pressure during operation. It is possible to operate at natural frequency and thus take advantage of the vast increase in performance at this point, which performance falls rapidly away as one departs from natural frequency. The pneumatic free-piston devices hereof are capable of immediate tuning to the natural frequency of the system.

FIG. 3 shows in diagrammatic form an apparatus set up in accordance with the present invention. The pneumatic vibrator indicated in FIG. 3 may be of the type shown in FIG. 2. This is rigidly affixed to the base of a bowl substantially in the manner shown in FIG. 1. An inlet line 32 is provided and is connected to the inlet of the pneumatic vibrator, such as inlet port 21 in FIG. 2. A pressurized gas source is provided, such as an air compressor, and the inlet line 32 is desirably, although not necessarily, fitted with a filter and lubricator, and a pressure regulating valve 33 for control of the inlet pressure. The exhaust ports of the pneumatic vibrator, such as exhaust ports 29 and 30 of FIG. 2 are led to a common header 34, leading to an outlet line 35. A pressure gauge 36 may be inserted in the line, if desired. Also in the outlet line 35 is a valve 37 for controlling the back pressure or pressure drop through the pneumatic vibrator. If desired, the exhaust gases leaving through outlet line 35 may be passed through a muffler to the atmosphere. Both valves 33 and 37 or the equivalent thereof are essential in order to secure the advantages of this invention. Valve 33 primarily controls frequency, and valve 37 primarily controls amplitude of vibration. While valve 33 alone can be used to a limited extent to decrease amplitude by increasing pressure and hence the frequency, and while valve 37 can be used alone to control frequency to a limited degree, the aforementioned primary functions of each brought about by their simultaneous presence in the system enable degrees of control over the operation of vibratory conveyor apparatus, regardless of configuration, never before achieved.

In operating the apparatus of this invention, the procedure is conveniently as follows:

With the valve 37 in the outlet line 35 wide open, gas under pressure, e.g., compressed air, is admitted to the pneumatic, free piston, vibration inducing device through inlet line 32 and pressure regulating valve 33. As the pressure of the inlet gas introduced to the vibrator increases, the frequency of vibration also increases. Natural frequency of the device, such as an apparatus illustrated in FIG. 1, can be arrived at by audible or visual tuning of the device. Once the device is operating at or near natural frequency, it tends to "lock-in" and remain in operation at this point even with slight variations in the pressure applied to the vibrator. The natural frequency of the device depicted in FIG. 1 was found to be 2250 under a bowl weight of 120 lbs. The bowl was 30 inches in diameter, and the free-piston 1⅝ inch diameter by 2⅞ inches long, weighing 1 lb., 4 ounces. The spring member 4 as shown in FIG. 1 was made from a rectangular piece of cold rolled steel 2 inches by 6 inches by 5/32 inch. Cut-outs to a depth of 0.5 inch were made in each side of the rectangular piece with a 2 inch radius milling cutter, the cut commencing and terminating 1 inch from the respective ends of the springs.

By conducting the exhaust from ports 29 and 30 as shown in FIGS. 2 and 3 into a common header 34 and into an exit line 35, and thence through a pressure regulating valve 37, it was found, most unexpectedly, that it was possible to control the amplitude of vibration, and hence the speed of travel of particles contained within the vibratory track, without a substantial change in the frequency of vibration. As the back pressure on the pneumatic vibrator was increased, or the pressure drop through the pneumatic vibrator decreased, the amplitude of vibration is also very markedly decreased while the frequency of vibration increased only slightly, i.e., of the order of 200–400 cycles per minute. By careful manipulation of both the inlet valve 33 and the outlet valve 37, it is possible to select amplitudes of vibration which are desirable under the circumstances and at the same time bring the device to operation at natural frequency, the most efficient point of operation. While it is possible to control the amplitude of vibration by increasing the inlet pressure to a point where the frequency of vibration is such that the amplitude is necessarily decreased, such a means of control of the power output of the device necessitates two losses, namely, the use of an excessive quantity of compressed gas, and operation of the device in a frequency range where the efficiency is very much lower than that which obtains at natural frequency. Throttle control on the outlet side of a pneumatically driven, free-piston vibration inducing device driving a vibratory conveyor enables the conservation of compressed gas, the most costly item of operation, while at the same time permitting the device to be operated at natural frequency where peak efficiency can be secured.

The remarkable control of performance is illustrated by FIG. 4 where the speed of travel of parts in a bowl of the type shown in FIG. 1 in terms of revolutions per minute about the periphery plotted against the back pressure in pounds per square inch gauge is shown.

The phenomena at work and producing the unsual effects encountered in this discovery are not fully understood, and the following explanation is theoretical. One would normally expect in an ideal fluid (non-viscous) that frequency of vibration in devices of the type herein described, and amplitude would be directly dependent upon the difference between the inlet pressure and the outlet pressure or, $\Delta P$. This has not been found in practice to be the case, and the effect noted is believed attributable to viscous fluid losses. If this is so, control of amplitude as herein described takes advantage of these viscous fluid losses to obtain a substantially independent relationship between amplitude and freqency. Viscous fluid losses include heat losses through the shell and a large loss through the change in entropy of the compressible gas when passing suddenly from a region of high pressure to a region of low pressure, particularly where the ratio of the pressures involved is greater than 2. Under these conditions, local regions of sonic velocity result which may only be decelerated by means of so-called "shock waves." It is in such shock wave that the large changes in entropy occur. This phenomena may, then, explain why amplitude can be controlled substantially by throttling exhaust gases, and frequency can be controlled substantially independently by controlling pressure of inlet gases. Of course, changes in $\Delta P$ do affect both amplitude and frequency, but changes in the inlet pressure have a greater influence on frequency than on amplitude, and changes in the exhaust orifice apparently have a greater influence on amplitude than on frequency.

In the description of this invention, reference has been made to throttling valves. It will, of course, be understood that other means of changing the $\Delta P$ across the pneumatic vibration inducing device will yield substantially the same results and it is merely preferable to use easily controllable devices such as the hand throttling valves shown in FIG. 3. Other orifice control means on the exit line such as pierced plugs having various size orifices for insertion in the exhaust line, or orifice plates for interposition in the exhaust line to effect a change in the pressure drop, or $\Delta P$, may be used as well to achieve the advantages of the present invention.

Figure 5:
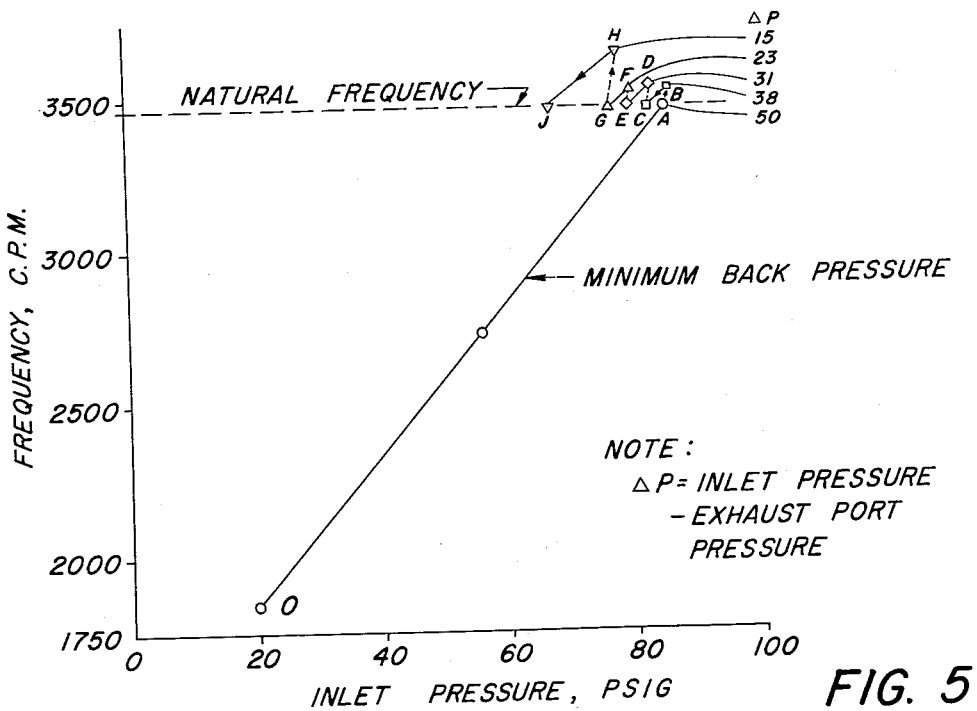
Figure 6:
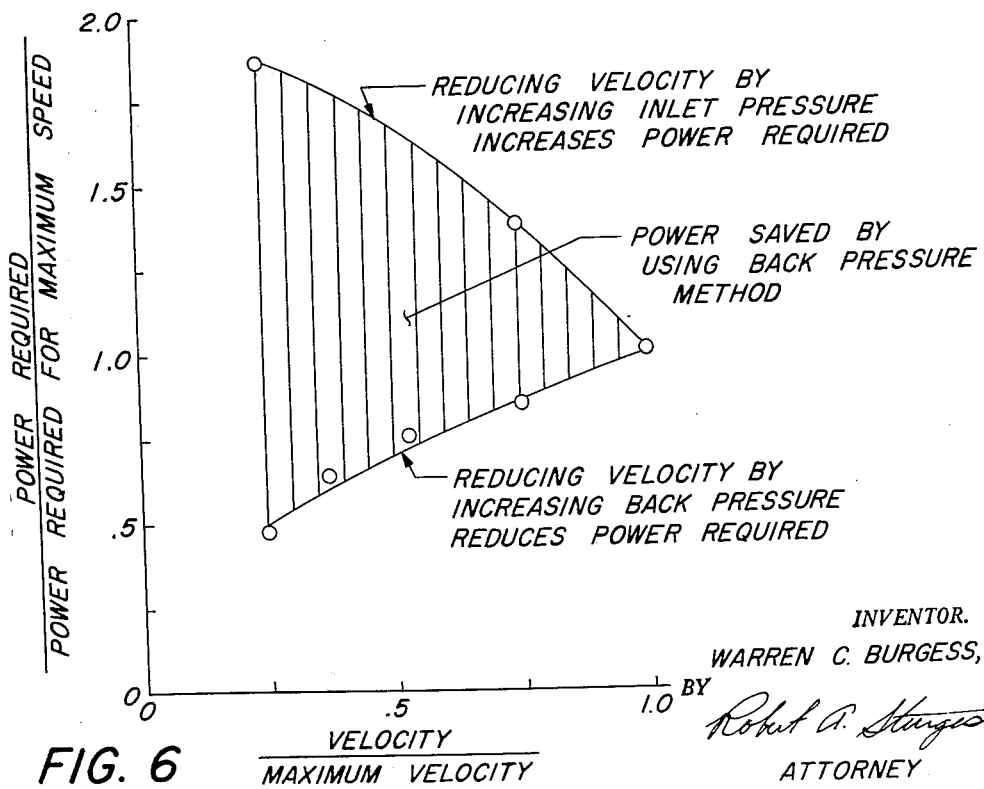

FIGS. 5 and 6 illustrate results obtained with a pneumatically vibrated bowl type feeder (FIG. 1) mounted on six springs in turn attached to a base which was anchored to a concrete floor.

The variation of frequency with inlet pressure is illustrated in FIG. 5 from O to A. At point A, the natural frequency of the system was reached, and rapid, efficient feeding of parts in the bowl resulted. Point A represents the maximum velocity obtainable with the above described unit. This is also the point of maximum power required and maximum pressure drop across the pneumatic vibrator.

The amplitude and speed at maximum power is often excessive for purposes of orienting and feeding parts. A reduction of amplitude is often desirable for maximum efficiency. This reduction may be achieved by reducing the power at the natural frequency of the system. In FIG. 5, the path from point A to point C illustrates this type of power reduction.

Point B in FIG. 5 was reached by increasing the back pressure to the drive by 10 pounds per square inch and thus reducing the pressure drop across the vibrator. This raised the frequency slightly necessitating a readjustment downward of the inlet pressure. Point C in FIG. 5 illustrates the condition at which the natural frequency is again reached.

In moving in like manner from A to J, the speed was dropped 25% and the power required was reduced 15%.

The data in FIG. 5 illustrates repetition of the foregoing manipulation down to an inlet pressure of 67 p.s.i.g.

The variation of velocity, presented as the ratio of velocity to maximum velocity, with the power, presented as the ratio of power to power required to attain maximum velocity, is presented in FIG. 6. A reduction in amplitude corresponding to a 75% velocity reduction formerly was obtainable only by increasing the inlet pressure to approximately 110 p.s.i.g. to obtain an off-synchronous frequency. This increase in pressure resulted in a power increase of approximately 87%. A power control system in accordance with FIG. 3 achieved a 75% reduction in speed with a net reduction in power of 60.5%.

Other modes of applying the principle of this invention may be employed instead of those specifically set forth above, changes being made as regards the details herein disclosed, provided the elements set forth in any of the following claims, or the equivalent of such be employed.

It is, therefore, particularly pointed out and distinctly claimed as the invention:

1. In a pneumatic vibratory apparatus having a resiliently supported article carrier and a vibration inducing piston disposed for free reciprocation in a chamber, an inlet line for supplying gas under pressure to said chamber, means for regulating the gas pressure in said inlet line, means coacting in response to the position of said piston in said chamber respectively to alternately apply said pressurized gas to opposite ends of the piston for a portion of its stroke, an outlet line for exhausting spent gas from the chamber, other means coacting in response to the position of said piston respectively to alternately couple the end of the chamber opposed to the applied gas to the outlet line for a portion of the piston stroke, and pressure regulating means coacting therewith in the outlet line to control the amplitude of reciprocation of said piston.

2. An apparatus in accordance with claim 1 in which the means for applying pressurized gas to opposite ends of the piston include a pair of internal ducts formed within said piston opening at opposite ends thereof and each having single entry means through the side of said piston alternately registrable with the inlet to said chamber.

3. An apparatus in accordance with claim 1 in which the other means for alternately coupling the ends of the chamber opposite the applied gas includes exhaust ports in the chamber wall adjacent the ends thereof.

4. An apparatus in accordance with claim 1 in which the means for applying pressurized gas to the opposite ends of the piston includes a pair of internal ducts formed within said piston opening at opposite ends thereof and each having single entry means through the side of said piston, an annular groove centrally disposed in the wall of said chamber, said entry means through the side of said piston being alternately registrable with said annular groove, and in which the other means for alternately coupling the ends of the chamber opposite the applied gas includes exhaust ports in the chamber wall adjacent the ends thereof.

References Cited in the file of this patent
UNITED STATES PATENTS

| | | |
|---|---|---|
| 860,088 | Tonjes | May 17, 1904 |
| 1,056,170 | Hansen | March 18, 1913 |
| 1,148,310 | Gilman | July 27, 1915 |
| 1,877,102 | Whitesell | Sept. 13, 1932 |
| 1,911,967 | Pickop | May 30, 1933 |
| 2,246,461 | Cannon | June 17, 1941 |
| 2,587,449 | Ericson | Feb. 26, 1952 |
| 2,699,224 | Schmitz | Jan. 11, 1955 |
| 2,758,704 | Spurlin | Aug. 14, 1956 |
| 2,787,251 | Becker | Apr. 2, 1957 |
| 2,821,172 | Randall | Jan. 28, 1958 |
| 2,861,548 | Burgess et al. | Nov. 25, 1958 |
| 2,868,357 | Thomas | Jan. 13, 1959 |